United States Patent
Nainar et al.

(10) Patent No.: US 10,785,137 B2
(45) Date of Patent: Sep. 22, 2020

(54) DATAPLANE-BASED SEAMLESS BIDIRECTIONAL FORWARDING DETECTION MONITORING FOR NETWORK ENTITIES

(71) Applicant: Cisco Technology, Inc., San Jose, CA (US)

(72) Inventors: Nagendra Kumar Nainar, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/531,201

(22) Filed: Aug. 5, 2019

(65) Prior Publication Data
US 2019/0356570 A1 Nov. 21, 2019

Related U.S. Application Data

(63) Continuation of application No. 15/869,322, filed on Jan. 12, 2018, now Pat. No. 10,447,571.

(51) Int. Cl.
*H04L 12/26* (2006.01)
*H04L 12/741* (2013.01)
(Continued)

(52) U.S. Cl.
CPC .............. *H04L 43/10* (2013.01); *H04L 45/50* (2013.01); *H04L 45/72* (2013.01); *H04L 45/745* (2013.01); *H04L 45/34* (2013.01)

(58) Field of Classification Search
None
See application file for complete search history.

(56) References Cited

U.S. PATENT DOCUMENTS 6,512,768 B1 1/2003 Thomas
6,680,911 B1 * 1/2004 Kim .................. H04L 12/40013
370/235

(Continued)

OTHER PUBLICATIONS

Fu, M., Le, Z., & Zhu, Z. (2012). Bfd-based failure detection and localization in IP over OBS/WDM multilayer network. International Journal of Communication Systems, 25(3), 277-293.

(Continued)

*Primary Examiner* — Ayaz R Sheikh
*Assistant Examiner* — Tarell A Hampton
(74) *Attorney, Agent, or Firm* — Edell, Shapiro & Finnan, LLC

(57) ABSTRACT

Dataplane-based Seamless Bidirectional Forwarding Detection (S-BFD) monitoring for network entities is provided. In one embodiment, a method of S-BFD monitoring includes assigning, by a network element, a unique segment identifier (ID) to each entity of a plurality of entities that are monitored by the network element. The method includes receiving an S-BFD control packet at the network element, including a first segment ID associated with a particular entity. The method also includes performing a lookup operation for the first segment ID in stored data of the network element. Based on the lookup operation, when a first action is designated in the stored data for the first segment ID, the method includes returning the S-BFD control packet to its source, and, when a second action is designated in the stored data for the first segment ID, the method includes forwarding the S-BFD control packet to an S-BFD reflector session.

20 Claims, 9 Drawing Sheets

(51) Int. Cl.
*H04L 12/721* (2013.01)
*H04L 12/723* (2013.01)

(56) References Cited

U.S. PATENT DOCUMENTS

| | | | |
|---|---|---|---|
| 6,910,148 | B1 | 6/2005 | Ho et al. |
| 9,497,107 | B1 | 11/2016 | Akiya et al. |
| 9,762,488 | B2 | 9/2017 | Previdi et al. |
| 9,838,246 | B1 | 12/2017 | Hegde et al. |
| 2003/0123457 | A1 | 7/2003 | Koppol |
| 2014/0269266 | A1 | 9/2014 | Filsfils et al. |
| 2014/0269727 | A1 | 9/2014 | Filsfils et al. |
| 2014/0369356 | A1 | 12/2014 | Bryant et al. |
| 2015/0029834 | A1 | 1/2015 | Zhang et al. |
| 2015/0256456 | A1 | 9/2015 | Previdi et al. |
| 2016/0036694 | A1 | 2/2016 | Abdul et al. |
| 2016/0036695 | A1 | 2/2016 | Mirsky et al. |
| 2016/0212038 | A1 | 7/2016 | Musiol et al. |
| 2016/0261474 | A1* | 9/2016 | Raghavan .............. H04L 43/10 |
| 2019/0222500 | A1 | 7/2019 | Nainar et al. |

OTHER PUBLICATIONS

Filsfils C, Nainar N K, Pignataro C, Cardona JC, Francois P. The Segment Routing Architecture. 2015 IEEE Global Communications Conference (GLOBECOM). Jan. 2015.

D. Katz, et al., "Bidirectional Forwarding Detection (BFD)", Internet Engineering Task Force (IETF), ISSN: 2070-1721, RFC 5880, Jun. 2010, 49 pages.

M. Chen, et al., "Return Path Specified Label Switched Path (LSP) Ping", Internet Engineering Task Force (IETF), ISSN: 2070-1721, RFC 7110, Jan. 2014, 21 pages.

C. Pignataro, et al., "Seamless Bidirectional Forwarding Detection (S-BFD)", Internet Engineering Task Force (IETF), ISSN: 2070-1721, RFC 7880, Jul. 2016, 24 pages.

* cited by examiner

DATAPLANE-BASED SEAMLESS BIDIRECTIONAL FORWARDING DETECTION MONITORING FOR NETWORK ENTITIES

CROSS REFERENCE TO RELATED APPLICATION

This application is a continuation of and claims benefit to U.S. application Ser. No. 15/869,322, filed Jan. 12, 2018, the entirety of which is incorporated herein by reference.

TECHNICAL FIELD

The present disclosure relates to monitoring a status of entities in a network.

BACKGROUND

Bidirectional Forwarding Detection (BFD) is an IETF (Internet Engineering Task Force) standard that allows two endpoints to monitor reachability over a link or a network by both ends periodically sending "hello" packets to each other. It is an efficient and generic hello/keepalive protocol that is widely used by many applications, including, for example Interior Gateway Protocols (IGPs), Exterior Gateway Protocols (EGPs) and protocols such as Hot Standby Router Protocol (HSRP), Inter-Chassis Communication Protocol (ICCP), and others.

Seamless Bidirectional Forwarding Detection (S-BFD) is a simplified mechanism for using BFD with a large proportion of negotiation aspects eliminated for network continuity testing.

DESCRIPTION OF EXAMPLE EMBODIMENTS

Overview

Presented herein is dataplane-based Seamless Bidirectional Forwarding Detection (S-BFD) monitoring for network entities. In an example embodiment, a computer-implemented method is provided that includes assigning, by a network element, a unique segment identifier (ID) to each entity of a plurality of entities that are monitored by the network element. The method includes receiving a seamless bidirectional forwarding detection (S-BFD) control packet at the network element. The S-BFD control packet includes at least a first segment ID associated with a particular entity of the plurality of entities. The method also includes performing a lookup operation for the first segment ID in stored data of the network element. Based on the lookup operation, when a first action is designated in the stored data for the first segment ID, the method includes returning the S-BFD control packet to its source, and, when a second action is designated in the stored data for the first segment ID, the method includes forwarding the S-BFD control packet to an S-BFD reflector session.

Example Embodiments

While S-BFD is scalable compared to traditional BFD, in a virtual environment, S-BFD presents several challenges for monitoring network entities. For example, in the case of monitoring entities in Massively Scalable Data Centers (MSDC), the number of entities, virtual machines, and/or containers to be monitored on a per-host basis can be very large, with numbers in the tens of thousands or hundreds of thousands. Creating an S-BFD reflector session and processing all S-BFD control packets in-band with such a large number of monitored entities can create significant issues of scale and/or performance.

Additionally, existing S-BFD Echo mode may be used to reduce intervention by the control plane, however, S-BFD Echo mode is not effective in the virtual or proxy environment. For example, in the virtual environment, the physical host may be functioning properly but one or more of the monitored entities may not be functioning properly. In such case, an S-BFD Echo packet would be returned to its source without identifying a failure of one of the monitored entities.

According to the principles of the example embodiments, dataplane-based S-BFD monitoring of a network entity allows a dataplane-based response when the monitored entity is functioning normally, and can also conditionally punt a control packet to an S-BFD reflector session when the monitored entity is not functioning normally.

Figure 1:
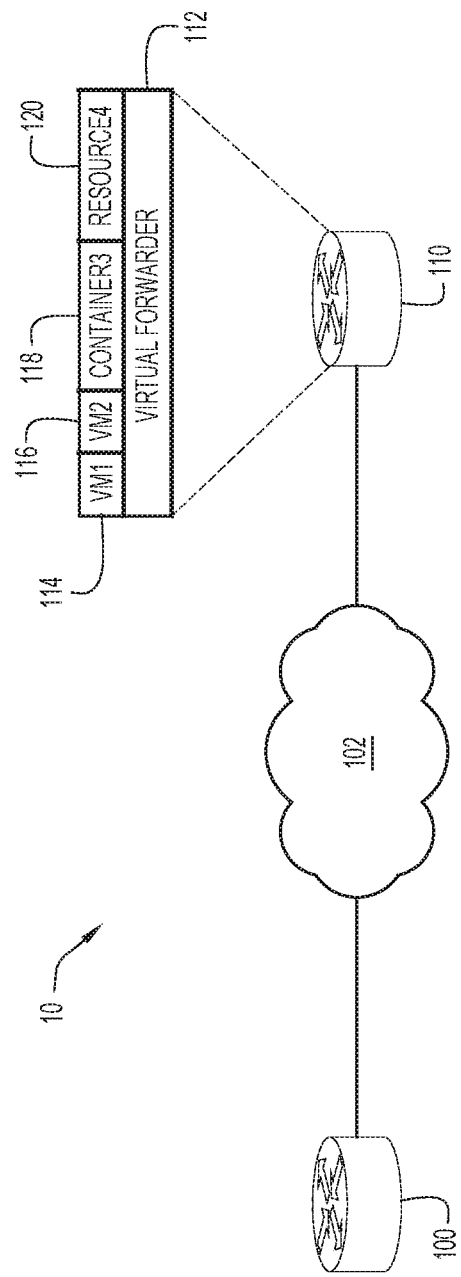
FIG. 1 is a block diagram of a network in which dataplane-based Seamless Bidirectional Forwarding Detection monitoring may be implemented, according to an example embodiment.

Referring first to FIG. 1, a network 10 is shown in which dataplane-based S-BFD monitoring of network entities may be implemented, according to an example embodiment. In this embodiment, network 10 may include a plurality of network elements, including at least a first network element 100 and a second network element 110. First network element 100 and second network element 110 can communicate with each other within network 10 through a network fabric or cloud 102. Network fabric or cloud 102 can include one or more wired or wireless networks, including, but not limited to a local area network (LAN), metropolitan area network (MAN), wide area network (WAN), virtual private network (VPN), virtual local area network (VLAN), wireless network, enterprise network, Internet, intranet, radio access network, public switched network, or any other network.

Network elements 100, 110 may be any computer, server, router, switch, bridge, gateway, load-balancer, firewall, processor, network appliance, or any other suitable device, component, element, or object capable of sending, receiving, or forwarding information over a communication network, for example, network 10. In this embodiment, network 10 includes two representative network elements 100, 110, however, it should be understood that network 10 may include any number of network elements. For example, in some embodiments, network 10 may be a Massively Scalable Data Center (MSDC) that includes many network elements that function as hosts for various virtual machines, containers, and/or other entities.

In this embodiment, second network element 110 may host an instance of a virtual forwarder function 112, as well as a plurality of monitored network entities, including a first virtual machine (VM1) 114, a second virtual machine (VM2) 116, a container process (Container3) 118, and another resource (Resource4) 120. For example, resource 120 may be a central processing unit (CPU) or memory associated with second network element 110. According to the principles of the example embodiments, virtual forwarder function 112 may be provided to implement data-plane-based S-BFD monitoring of network entities, for example, first virtual machine 114, second virtual machine 116, container process 118, and/or resource 120. While four monitored entities are shown in the example embodiments, it should be understood that a network element (e.g., second network element 110) may host any number of monitored entities. For example, in a virtual environment or a proxy environment, a single network element may host tens of thousands or hundreds of thousands of entities, each of which may have its status monitored by the network element.

Figure 2:
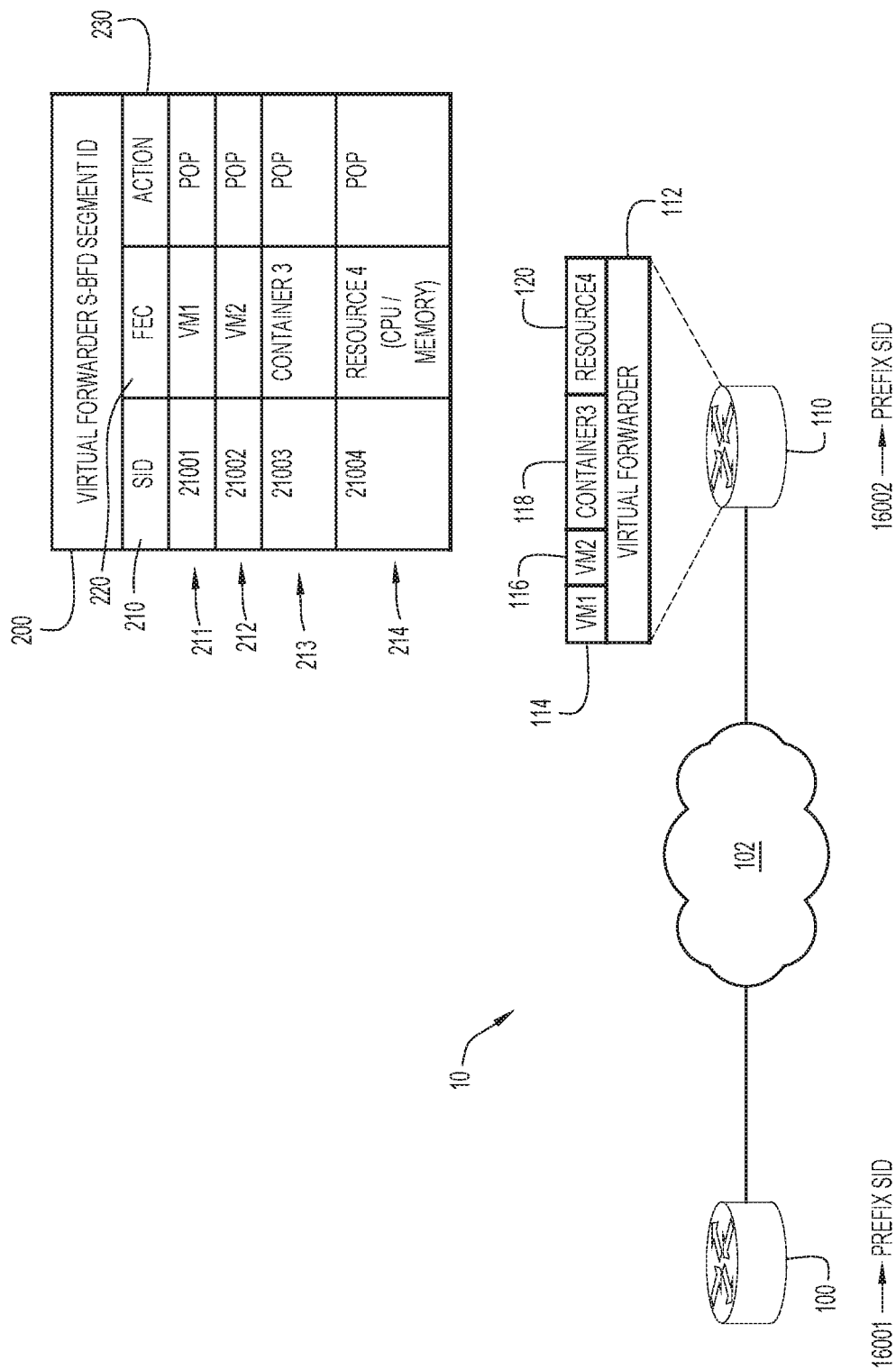
FIG. 2 is a diagram of a virtual forwarder function at a network element for monitoring entities, according to an example embodiment.

Reference is now made to FIG. 2. FIG. 2 shows virtual forwarder function 112 at second network element 110 monitoring a plurality of network entities 114, 116, 118, 120. In this embodiment, second network element 110 assigns a locally unique segment identifier (ID) for each entity to be monitored. For example, the segment ID may be a Multi-protocol Label Switching (MPLS) label, a Segment Routing (SRv6) segment identifier (SID), or other suitable identifier. The segment ID may be assigned by the physical host (e.g., second network element 110) and/or virtual forwarder function 112. The assigned segment IDs for the monitored entities may be included in stored data at second network element 110. For example, second network element 110 may include a forwarding table 200 that contains the segment IDs for the entities monitored by second network element 110. Forwarding table 200 may be used by virtual forwarder function 112 to determine an action for each monitored entity based on its operating status, as will be further described below.

As shown in FIG. 2, forwarding table 200 includes at least a segment ID field 210, an entity field 220, and an action field 230. In this embodiment, forwarding table 200 includes an entry for each monitored entity (e.g., entities 114, 116, 118, 120). For example, forwarding table 200 includes a first entry 211 associated with first virtual machine 114, a second entry 212 associated with second virtual machine 116, a third entry 213 associated with container process 118, and a fourth entry 214 associated with resource 120. First entry 211 for first virtual machine 114 includes a first segment ID (21001) in segment ID field 210, name of first virtual machine (VM1) in entity field 220, and a first action (POP) in action field 230. As will be described in more detail below, one of two possible actions may be included in action field 230 of forwarding table 230, POP or Punt. The first action (POP) indicates to virtual forwarder function 112 that an S-BFD control packet directed to a monitored entity with a segment ID associated with the first action (i.e., POP) in action field 230 should be returned to the source of the S-BFD control packet. The second action (Punt) indicates to virtual forwarder function 112 that an S-BFD control packet directed to a monitored entity with a segment ID associated with the second action (i.e., Punt) in action field 230 should be forwarded to an S-BFD reflector session.

Second entry 212 for second virtual machine (VM2) includes a second segment ID (21002) in segment ID field 210, name of second virtual machine (VM2) in entity field 220, and the first action (POP) in action field 230. Third entry 213 for container process 118 includes a third segment ID (21003) in segment ID field 210, name of container process (Container3) in entity field 220, and the first action (POP) in action field 230. Fourth entry 214 for resource 120 includes a fourth segment ID (21004) in segment ID field 210, name of resource (Resource4) in entity field 220, and the first action (POP) in action field 230. In this example, each entity being monitored by second network element 110 (e.g., entities 114, 116, 118, 120) has its respective segment ID associated with the first action (POP) in action field 230, indicating to virtual forwarder function 112 that a BFD control packet directed to any of the entities should be returned back to its source.

Figure 3:
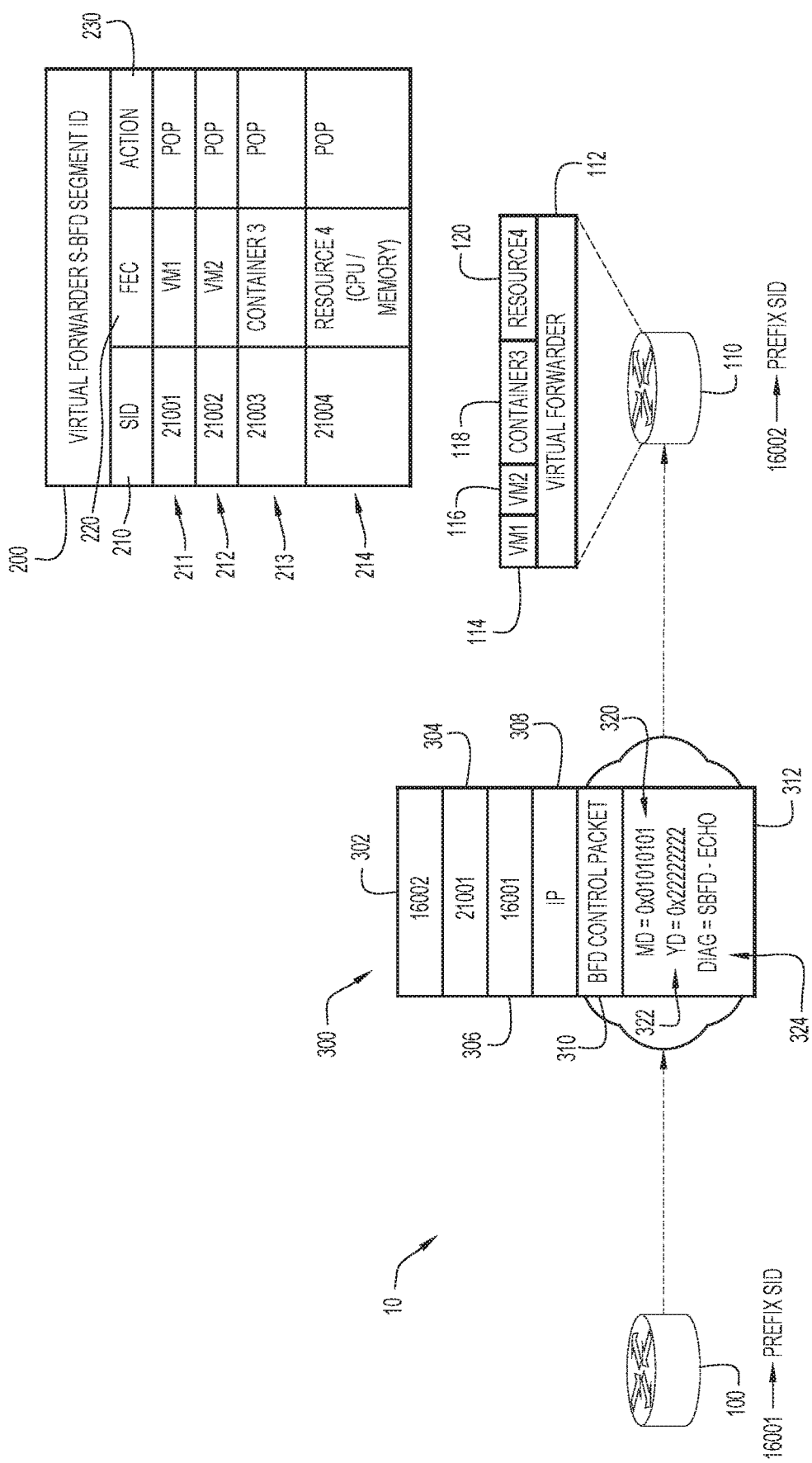
FIG. 3 is a diagram of a source sending a control packet to a virtual forwarder to determine a monitored entity status, according to an example embodiment.

Referring now to FIG. 3, a source (e.g., first network element 100) is shown sending an S-BFD control packet 300 to virtual forwarder function 112 of second network element 110 to determine a monitored entity status, according to an example embodiment. Within a network, for example, network 10, a network element may send out one or more S-BFD control packets to perform a continuity check on one or more monitored network entities for the purposes of determining whether a particular entity is reachable on the network. For example, to determine reachability for providing a specific service function as part of a service function chain or for providing other services or functions.

S-BFD control packet 300 may be, for example, IPv4, IPv6, Multiprotocol Label Switching (MPLS), or any other suitable type of packet. In this example, S-BFD control packet 300 includes a target prefix segment ID 302 (16002) for a network element (e.g., second network element 110) hosting the network entity whose reachability is being checked, as well as a particular segment ID 304 (21001) that is associated with the particular network entity being checked. In this case, the network entity associated with particular segment ID 304 is first virtual machine 114, which has been assigned first segment ID (21001) by second network element 110 or virtual forwarder function 112.

The S-BFD control packet 300 also includes a source prefix segment ID 306 (16001) that identifies the source of S-BFD control packet 300 (e.g., first network element 100), a packet protocol 308 (IP), and a label 310 identifying S-BFD control packet 300 as a BFD Control Packet. S-BFD control packet 300 also includes a status section 312 that includes fields to identify appropriate S-BFD Discriminators, including a My Discriminator (MD) field 320 associated with a first discriminator identifier (set to 0x01010101) and a Your Discriminator (YD) field 322 associated with a second discriminator identifier (set to 0x22222222), and a diagnostic (Diag) field 324 associated with a first diagnostic code (set to SBFD-Echo). Status section 312 of S-BFD control packet 300 may be used by first network element 100 to determine the status of the particular monitored entity being checked, as will be further described below.

Figure 4:
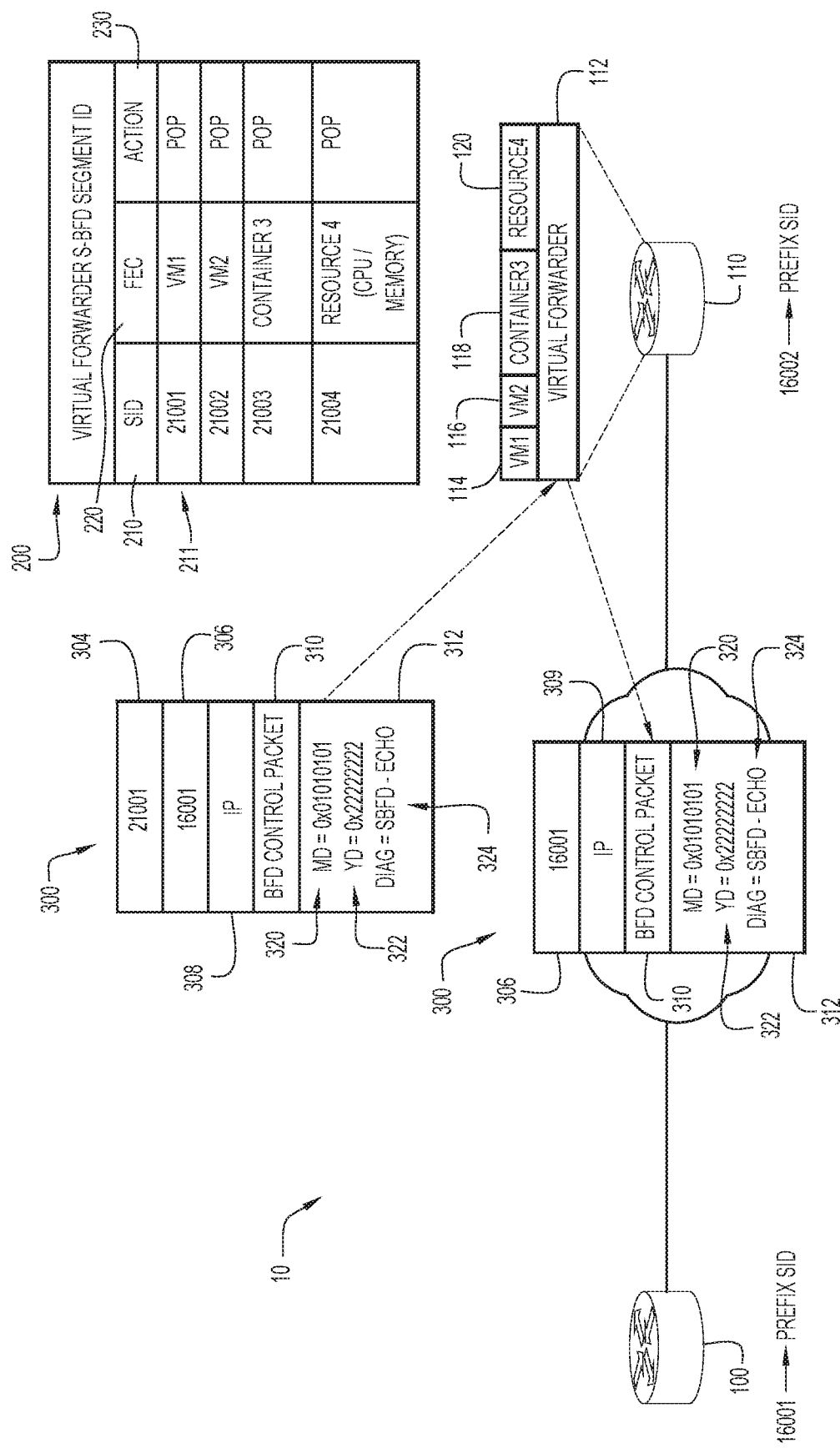
FIG. 4 is a diagram of a control packet returned by a virtual forwarder for a normally functioning monitored entity, according to an example embodiment.

Reference is now made to FIG. 4. FIG. 4 illustrates S-BFD control packet 300 returned by virtual forwarder function 112 when a monitored entity is functioning normally, according to an example embodiment. In this embodiment, S-BFD control packet 300 from first network element 100 is received by virtual forwarder function 112 and the particular segment ID 304 that identifies a particular entity of the plurality of monitored entities 114, 116, 118, 120 is compared with stored data at second network element 110. For example, virtual forwarder function 112 may perform a lookup operation for entries in segment ID field 210 of forwarding table 200 that match particular segment ID 304. In this case, particular segment ID 304 (21001) matches first segment ID (21001) of first entry 211 in forwarding table 200, which corresponds to first virtual machine 114 (VM1). First entry 211 includes first action (POP) in action field 230 for first virtual machine 114.

In this example, first action (POP) for first virtual machine 114 causes virtual forwarder function 112 to return S-BFD control packet 300 to its source (e.g., first network element 100) without making any changes to status section 312 of S-BFD control packet 300. As a result, S-BFD control packet 300 is returned to first network element 100, identified as the source of S-BFD control packet 300 by source prefix segment ID 306 (16001), with the same first discriminator identifier in My Discriminator (MD) field 320 (set to 0x01010101), the same second discriminator identifier in Your Discriminator (YD) field 322 (set to 0x22222222), and the same first diagnostic code in diagnostic (Diag) field 324 (set to SBFD-Echo). Upon receipt of S-BFD control packet 300 without changes to status section 312, first network element 100 can determine that the status of the particular monitored entity being checked (e.g., first virtual machine 114) is functioning normally.

Figure 5:
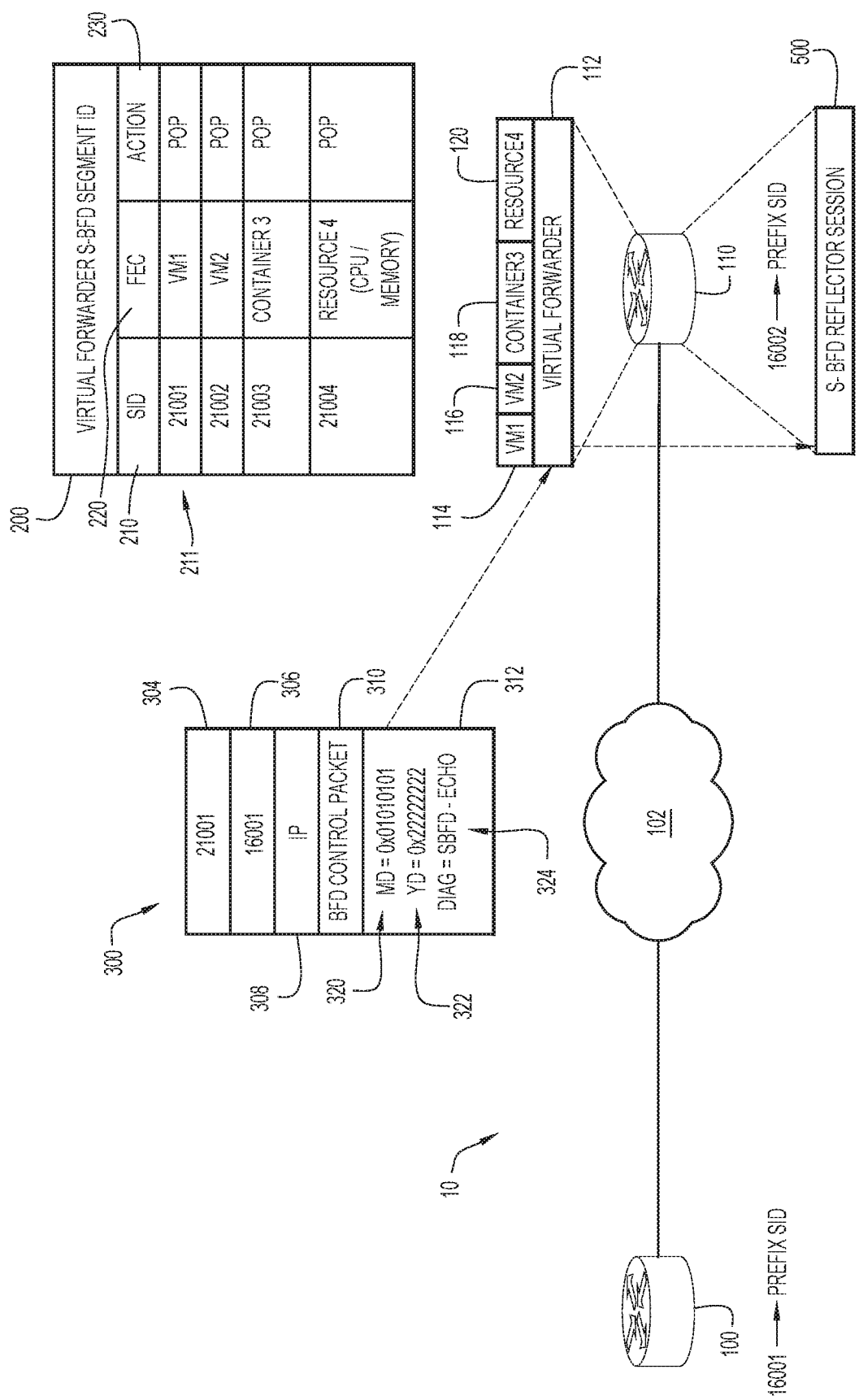
FIG. 5 illustrates a control packet forwarded to a reflector session by a virtual forwarder for a monitored entity that is not functioning normally, according to an example embodiment.

Turning now to FIG. 5, an S-BFD control packet 300 is shown that is forwarded to an S-BFD reflector session 500 by virtual forwarder 112 for a monitored entity that is not functioning normally, according to an example embodiment. In this embodiment, S-BFD control packet 300 from first network element 100 is received by virtual forwarder function 112 and particular segment ID 304 that identifies a particular entity of plurality of monitored entities 114, 116, 118, 120 is compared with stored data at second network element 110, as described above with reference to FIG. 4. In this case, however, first entry 211 in forwarding table 200 that is associated with first segment ID (21001) includes a second action (Punt) in action field 230 for first virtual machine 114.

The second action (Punt) in stored data at the monitoring network element (e.g., second network element 110) indicates a failure of a monitored entity. A failure of a monitored entity may be determined based on a threshold violation of the monitored entity or based on the monitored entity being down or unavailable for a particular service. For example, second network element 110 and/or virtual forwarder function 112 may change action field 230 in forwarding table 200 for a monitored entity when it is determined to not be functioning normally. In the example of FIG. 5, first virtual machine 114 is not functioning normally, and, therefore, action field 230 of first entry 211 in forwarding table 200 associated with first segment ID (21001) for first virtual machine 114 is changed from the first action (POP) to the second action (Punt).

Figure 6:
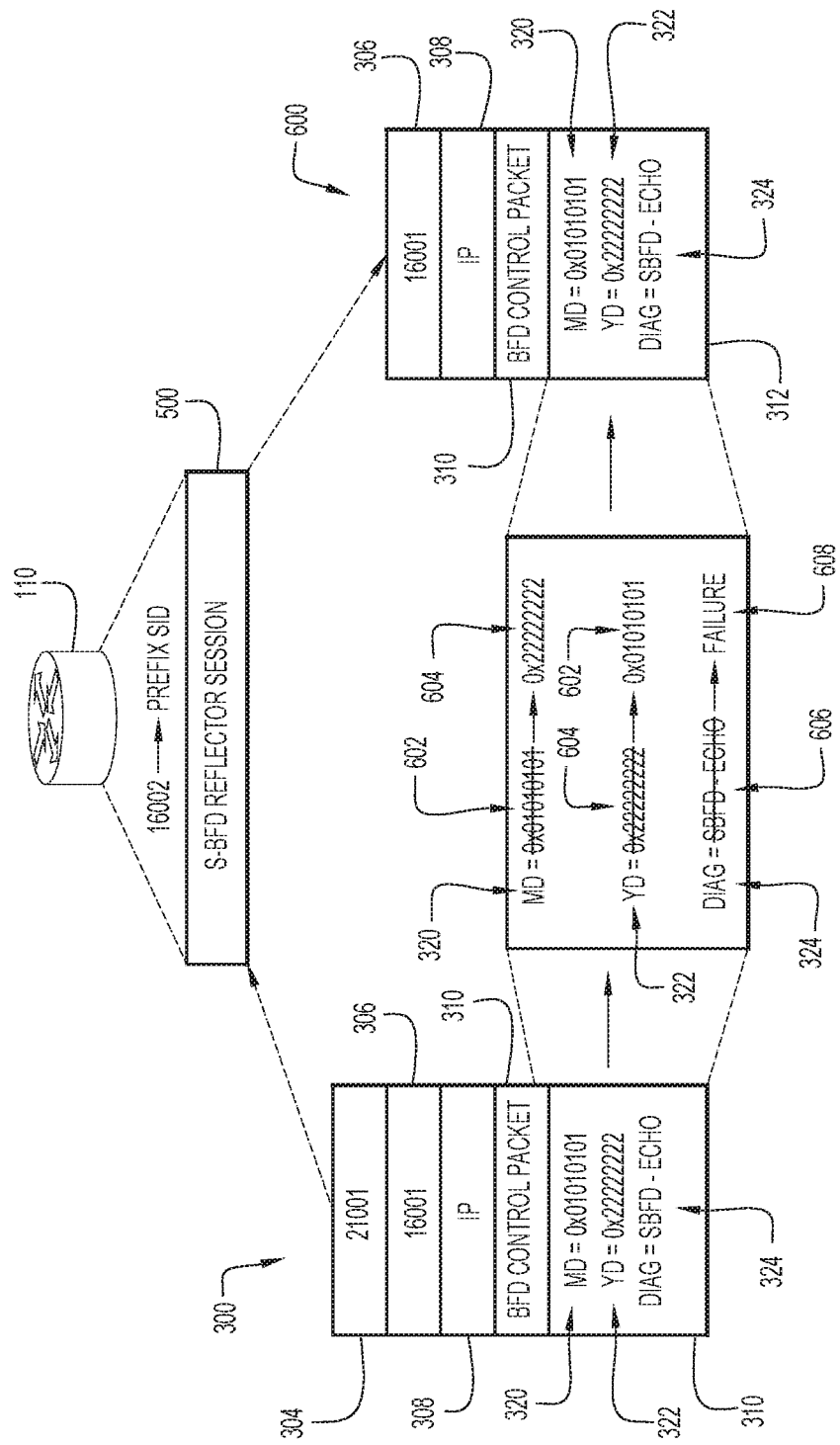
FIG. 6 is a diagram of a reflector session process to modify a control packet, according to an example embodiment.

When the second action (Punt) is designated in the stored data for a monitored entity, the S-BFD control packet 300 is forwarded to an S-BFD reflector session. For example, S-BFD reflector session 500 may be instantiated on second network element 110. Referring now to FIG. 6, S-BFD reflection session 500 is illustrated modifying S-BFD control packet 300 according to an example embodiment. In this embodiment, S-BFD reflector session 500 performs a process on S-BFD control packet 300 to change information stored in status section 312, and, thereby generate a modified S-BFD control packet 600. Modified S-BFD control packet 600 may be transmitted to the source of S-BFD control packet 300 (e.g., first network element 100) as a response to a status check for a monitored entity.

In this embodiment, S-BFD control packet 300 includes first segment ID (21001) associated with first virtual machine 114, which second network element 110 and/or virtual forwarder function 112 has determined is not functioning normally, as described above. As a result, virtual forwarder function 112 has punted S-BFD control packet 300 to S-BFD reflector session 500, where S-BFD reflector session 500 proceeds to modify status section 312 of S-BFD control packet 300. As shown in FIG. 6, S-BFD reflector session 500 modifies status section 312 of S-BFD control packet 300 to change My Discriminator (MD) field 320 from a first discriminator identifier 602 (0x01010101) to a second discriminator identifier 604 (0x22222222). S-BFD reflector session 500 also changes Your Discriminator (YD) field 322 from the second discriminator identifier 604 (0x22222222) to the first discriminator identifier 602 (0x01010101). That is, the respective discriminator identifiers in My Discriminator (MD) field 320 and Your Discriminator (YD) field 322 are switched with each other. Additionally, S-BFD reflector session 500 changes diagnostic (Diag) field 324 from a first diagnostic code 606 (SBFD-Echo) to a second diagnostic code 608 (Failure).

Upon completion of the modification process by S-BFD reflector session 500, modified S-BFD control packet 600 is generated. Modified S-BFD control packet 600 includes most of the same information as S-BFD control packet 300, including the same source prefix segment ID 306 (16001) that identifies the source of S-BFD control packet 300 (e.g., first network element 100), the same packet protocol 308 (IP), and the same label 310 identifying modified S-BFD control packet 600 as a BFD Control Packet. However, the information contained in status section 312 of modified S-BFD control packet 600 is changed from S-BFD control packet 300 by S-BFD reflector session 500. In this example, status section 312 of modified S-BFD control packet 600 includes My Discriminator (MD) field 320 associated with second discriminator identifier 604 (set to 0x22222222), Your Discriminator (YD) field 322 associated with first discriminator identifier 602 (set to 0x01010101), and diagnostic (Diag) field 324 associated with second diagnostic code (set to Failure).

Figure 7:
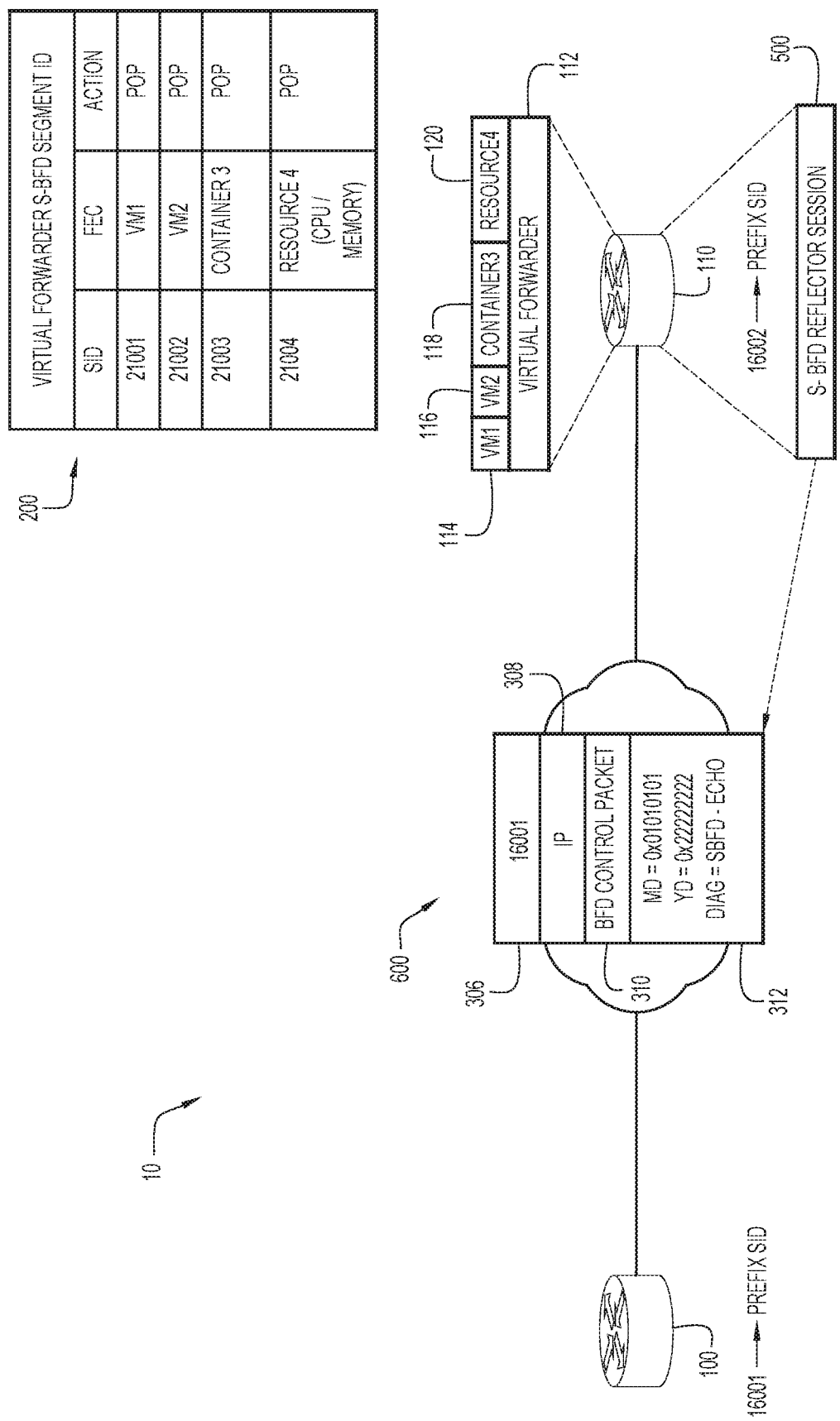
FIG. 7 is a diagram of a modified control packet for a malfunctioning monitored entity transmitted to a status-requesting source, according to an example embodiment.

Referring now to FIG. 7, after completion of S-BFD reflector session 500 process, modified S-BFD control packet 600 may be transmitted back to the source of the received S-BFD control packet 300 (e.g., first network element 100), which is identified by source prefix segment ID 306 (16001). First network element 100 determines that the particular monitored entity whose status is being checked (e.g., first virtual machine 114) is not functioning properly upon receipt of modified S-BFD control packet 600. For example, changes in status section 312 of modified S-BFD control packet 600, including the presence of second diagnostic code in diagnostic (Diag) field 324 associated with a failure of the monitored entity, may be used by first network element 100 to determine that the monitored entity is not functioning normally. With this arrangement, first network element 100 may use this status information about the monitored entity to update or change its network routing tables or other information about network 10, for example, available service functions for a service function chain.

Figure 8:
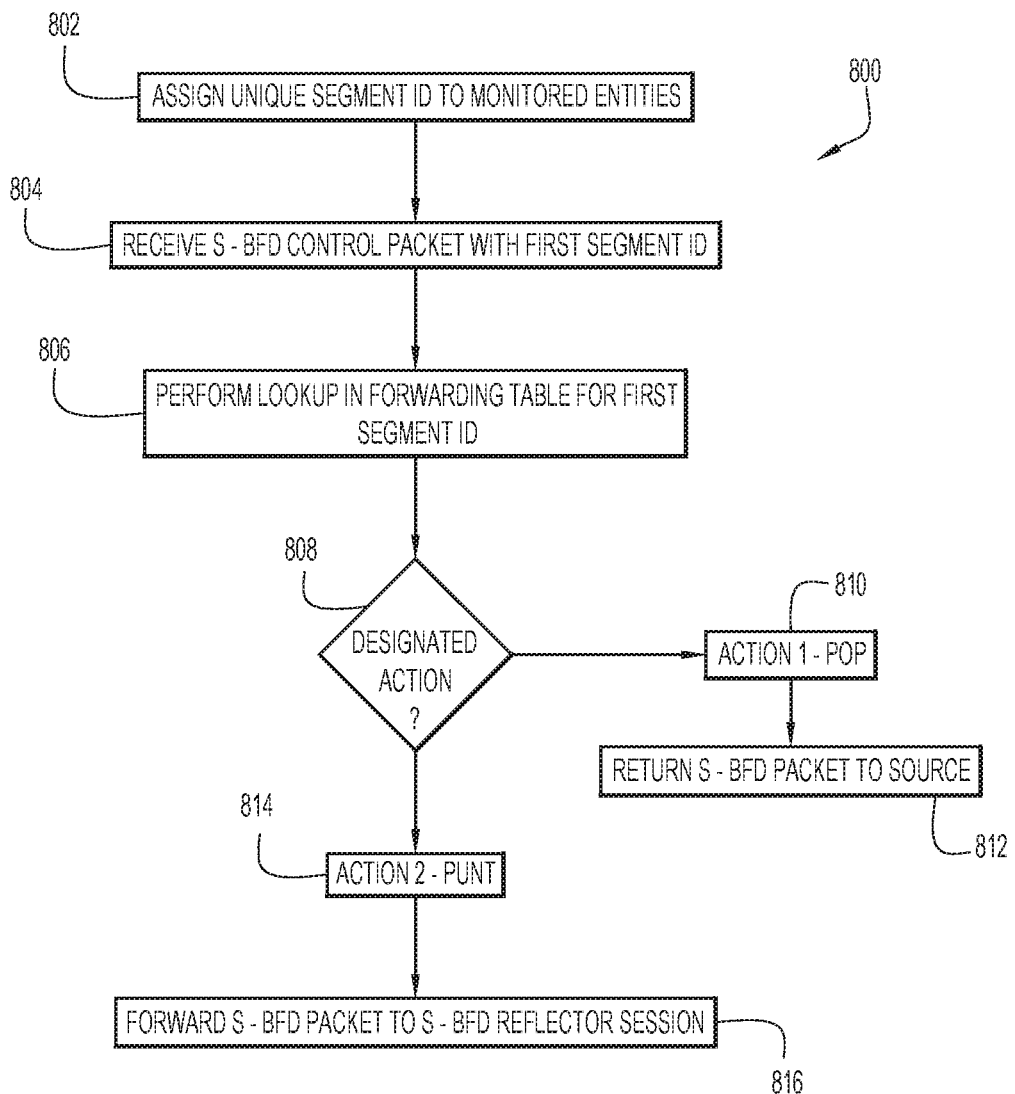
FIG. 8 is a flowchart of a method of implementing dataplane-based Seamless Bidirectional Forwarding Detection monitoring, according to an example embodiment.

FIG. 8 illustrates a method 800 of implementing dataplane-based S-BFD monitoring of network entities, according to an example embodiment. In this embodiment, method 800 may begin at an operation 802, where a unique segment ID is assigned to each monitored entity of a plurality of entities. For example, second network element 110 may assign unique segment IDs to each entity of plurality of entities 114, 116, 118, 120 that are being monitored by second network element 110, as described above.

Next, at an operation 804, an S-BFD control packet is received that includes a first segment ID associated with a particular entity of the plurality of entities being monitored by the network element receiving the S-BFD control packet. For example, S-BFD control packet 300 received by second network element 110 includes particular segment ID 304. At an operation 806, the network element receiving the S-BFD control packet performs a lookup operation in stored data at the network element to determine whether the first segment ID included in the S-BFD control packet matches a segment ID of any entity being monitored by that network element. For example, virtual forwarder function 112 and/or second network element 110 may perform a lookup operation for entries in segment ID field 210 of forwarding table 200 that match particular segment ID 304.

At an operation 808, the designated action in the stored data associated with the matching entry for the first segment ID included in the S-BFD control packet is determined. If, at operation 808, a first action is designated, then method 800 proceeds to an operation 810 where the first action (e.g., POP) is performed. At an operation 812, the S-BFD control packet is returned to its source as a result of performing the first action at operation 810, for example, as described above with reference to S-BFD control packet 300 shown in FIG. 4. If, at operation 808, a second action is designated, then method 800 instead proceeds to an operation 814 where the second action (e.g., Punt) is performed. At an operation 816, the S-BFD control packet is forwarded to an S-BFD reflector session as a result of performing the second action at operation 814, for example, as described above with reference to S-BFD control packet 300 shown in FIG. 5.

Additionally, after operation 816, method 800 may further include operations of modifying the S-BFD control packet during the S-BFD reflector session to generate the modified S-BFD control packet, as described above with reference to FIG. 6. While method 800 has been described in relation to a representative S-BFD control packet associated with a particular monitored entity, it should be understood that method 800 may be repeated for a plurality of S-BFD control packets, with each S-BFD control packet being associated with a particular segment ID of a particular entity of a plurality of entities. For example, as described above, in some cases, the number of monitored entities may be large, such as tens of thousands or hundreds of thousands of monitored entities per host or network element.

Figure 9:
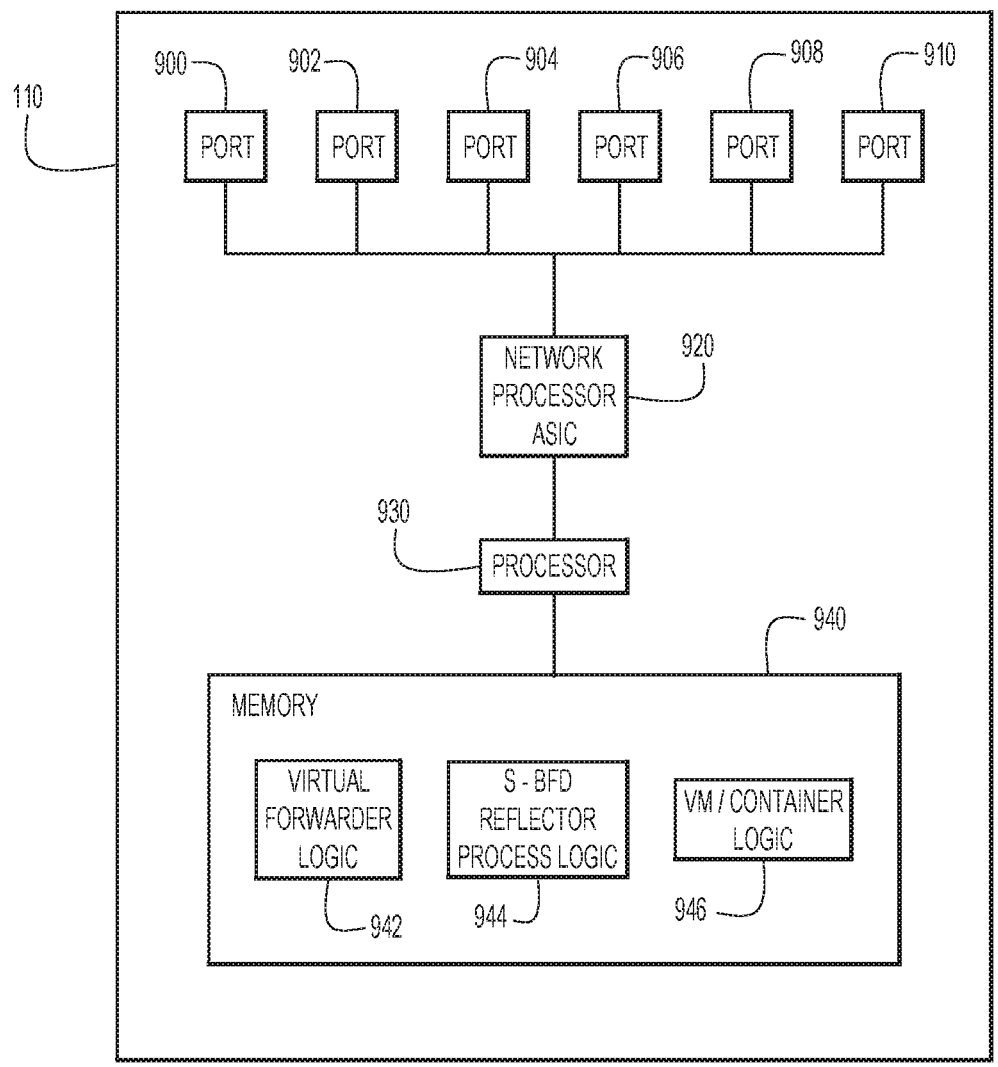
FIG. 9 is a block diagram of a network element configured to monitor entities and implement virtual forwarding functions, according to an example embodiment.

Referring now to FIG. 9, an example embodiment of a network element that is configured to monitor entities and implement virtual forwarding functions, for example, second network element 110, is shown. In this embodiment, second network element 110 may include a plurality of network ports 900, 902, 904, 906, 908, 910, a Network Processor ASIC 920, a processor 930 for processing information and may further include a bus (not shown) or other communication mechanism coupled with processor 930 for communicating the information. The Network Processor ASIC 920 performs any of a variety of networking functions (routing, switch, network address translation, etc.). Network Processor ASIC 920 may also be referred to herein as a network processor unit that performs one or more networking functions for packets received at the network ports 900, 902, 904, 906, 908, 910 and to be sent from the ports. Network Processor ASIC 920, may, for example, include one or more linecards configured to enable network communications and permit the plurality of network ports 900, 902, 904, 906, 908, 910 to receive inbound packets and to send outbound packets. While the figure shows a single block 930 for a processor, it should be understood that the processor 930 may represent a plurality of processing cores, each of which can perform separate processing.

Second network element 110 may also include a memory 940. The memory 940 may be read only memory (ROM), random access memory (RAM), magnetic disk storage media devices, optical storage media devices, flash memory devices, electrical, optical, or other physical/tangible memory storage devices. Thus, in general, the memory 940 may comprise one or more tangible (non-transitory) computer readable storage media (e.g., a memory device) encoded with software comprising computer executable instructions and when the software is executed (by the processor 930) it is operable to perform the operations described herein. For example, one or more of virtual forwarder control logic 942, S-BFD reflector process control logic 944, and virtual machine/container control logic 946 is stored in memory 940 for providing one or more of the functions of second network element 110 described herein. In particular, virtual forwarder control logic 942 may cause second network element 110 to perform the virtual forwarder function operations described above in connection with virtual forwarder function 112 of FIGS. 1-8 above when executed by processor 930 from memory 940. Similarly, S-BFD reflector process control logic 944 may cause second network element 110 to perform the S-BFD reflection session operations described above in connection with S-BFD reflector session 500 of FIGS. 5-8 above when executed by processor 930 from memory 940. Additionally, virtual machine/container control logic 946 may cause second network element 110 to instantiate one or more virtual machines, containers, or other resources that are entities monitored by second network element 110 as described in FIGS. 1-8 above when executed by processor 930 from memory 940.

In addition, memory 940 may be used for storing temporary variables or other intermediate information during the execution of instructions by processor 930. Additionally, in some embodiments, one or more functions of second network element 110, virtual forwarder control logic 942, S-BFD reflector process control logic 944, and virtual machine/container control logic 946 may be performed by Network Processor Application Specific Integrated Circuit (ASIC) 920.

The example embodiments provide a dataplane-based response for network entity monitoring and continuity checking that can conditionally punt an S-BFD control packet to an S-BFD reflector session under certain failure events.

The principles of the embodiments described herein assist with maximizing scalability in an MSDC environment.

The example embodiments provide a conditional dataplane-based response where the result of a monitored service/entity is directly tied to a dataplane forwarding semantic of an associated label/segment ID. The default forwarding semantic of a label/segment ID is set to POP as long as the monitored service/entity is up. If the service/entity is down, the dataplane semantic will be changed from POP to Punt to an S-BFD reflector session.

In summary, a computer-implemented method is provided comprising: assigning, by a network element, a unique segment identifier (ID) to each entity of a plurality of entities that are monitored by the network element; receiving a seamless bidirectional forwarding detection (S-BFD) control packet at the network element, the S-BFD control packet including at least a first segment ID associated with a particular entity of the plurality of entities; performing a lookup operation for the first segment ID in stored data of the network element; and based on the lookup operation, when a first action is designated in the stored data for the first segment ID, returning the S-BFD control packet to its source; and when a second action is designated in the stored data for the first segment ID, forwarding the S-BFD control packet to an S-BFD reflector session.

In another form, one or more non-transitory computer readable storage media encoded with instructions that, when executed by a processor of a network element, cause the processor to: assign a unique segment identifier (ID) to each entity of a plurality of entities that are monitored by the network element; receive a seamless bidirectional forwarding detection (S-BFD) control packet, the S-BFD control packet including at least a first segment ID associated with a particular entity of the plurality of entities; perform a lookup operation for the first segment ID in stored data of the network element; and based on the lookup operation, when a first action is designated in the stored data for the first segment ID, return the S-BFD control packet to its source; and when a second action is designated in the stored data for the first segment ID, forward the S-BFD control packet to an S-BFD reflector session.

In addition, an apparatus is provided comprising: a plurality of network ports configured to receive inbound packets and to send outbound packets, the plurality of network ports in communication with a plurality of entities that are monitored by the apparatus; a memory; a processor coupled to the memory and to the plurality of network ports, wherein the processor is configured to: assign a unique segment identifier (ID) to each entity of the plurality of entities that are monitored by the apparatus; receive a seamless bidirectional forwarding detection (S-BFD) control packet, the S-BFD control packet including at least a first segment ID associated with a particular entity of the plurality of entities; perform a lookup operation for the first segment ID in stored data; and based on the lookup operation, when a first action is designated in the stored data for the first segment ID, return the S-BFD control packet to its source; and when a second action is designated in the stored data for the first segment ID, forward the S-BFD control packet to an S-BFD reflector session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
    assigning, by a network element, a unique segment identifier (ID) to each entity of a plurality of entities that are monitored by the network element;
    receiving a seamless bidirectional forwarding detection (S-BFD) control packet at the network element, the S-BFD control packet including at least a first segment ID associated with a particular entity of the plurality of entities;
    performing a lookup operation for the first segment ID in stored data of the network element;
    determining whether the particular entity is functioning normally based on the lookup operation; and
    handling a forwarding disposition of the S-BFD control packet based on determining whether the particular entity is functioning normally.

2. The method of claim 1, wherein handling the forwarding disposition of the S-BFD control packet includes changing an action from a first action to a second action.

3. The method of claim 2, wherein changing the action from the first action to the second action is based on determining whether or not the particular entity is functioning normally.

4. The method of claim 1, wherein handling the forwarding disposition includes:
    when a first action is designated in the stored data for the first segment ID, returning the S-BFD control packet to a source; and
    when a second action is designated in the stored data for the first segment ID, forwarding the S-BFD control packet to an S-BFD reflector session.

5. The method of claim 4, wherein the S-BFD control packet further includes a first discriminator field associated with a first discriminator identifier (ID), a second discriminator field associated with a second discriminator identifier (ID), and a diagnostic field associated with a first diagnostic code.

6. The method of claim 5, wherein, when the first action is designated, the S-BFD control packet returned to the source includes the same first discriminator ID in the first discriminator field, the same second discriminator ID in the second discriminator field, and the same first diagnostic code in the diagnostic field as the S-BFD control packet received by the network element.

7. The method of claim 5, wherein, when the second action is designated, the method further comprising:
    modifying the S-BFD control packet to change the first discriminator field to the second discriminator ID, change the second discriminator field to the first discriminator ID, and change the diagnostic field to a second diagnostic code.

8. The method claim 1, further comprising:
    receiving a plurality of S-BFD control packets at the network element, wherein each S-BFD control packet includes at least an indicated segment ID associated with an entity of the plurality of entities;
    performing the lookup operation for each indicated segment ID in the stored data of the network element; and
    based on the lookup operation,
    when a first action is designated in the stored data for a particular indicated segment ID, returning that S-BFD control packet to a source; and
    when a second action is designated in the stored data for the particular indicated segment ID, forwarding that S-BFD control packet to an S-BFD reflector session.

9. One or more non-transitory computer readable storage media encoded with instructions that, when executed by a processor of a network element, cause the processor to perform operations including:
    assigning, by the network element, a unique segment identifier (ID) to each entity of a plurality of entities that are monitored by the network element;
    receiving a seamless bidirectional forwarding detection (S-BFD) control packet at the network element, the S-BFD control packet including at least a first segment ID associated with a particular entity of the plurality of entities;

performing a lookup operation for the first segment ID in stored data of the network element;

determining whether the particular entity is functioning normally based on the lookup operation; and handling a forwarding disposition of the S-BFD control packet based on determining whether the particular entity is functioning normally.

10. The one or more non-transitory computer readable storage media of claim 9, wherein handling the forwarding disposition of the S-BFD control packet includes changing an action from a first action to a second action.

11. The one or more non-transitory computer readable storage media of claim 10, wherein changing the action from the first action to the second action is based on determining whether or not the particular entity is functioning normally.

12. The one or more non-transitory computer readable storage media of claim 9, wherein handling the forwarding disposition includes:

when a first action is designated in the stored data for the first segment ID, returning the S-BFD control packet to a source; and when a second action is designated in the stored data for the first segment ID, forwarding the S-BFD control packet to an S-BFD reflector session.

13. The one or more non-transitory computer readable storage media of claim 12, wherein the S-BFD control packet further includes a first discriminator field associated with a first discriminator identifier (ID), a second discriminator field associated with a second discriminator identifier (ID), and a diagnostic field associated with a first diagnostic code.

14. The one or more non-transitory computer readable storage media of claim 13, wherein, when the first action is designated, the instructions cause the processor to perform:

returning the S-BFD control packet to the source, wherein the returned S-BFD control packet includes the same first discriminator ID in the first discriminator field, the same second discriminator ID in the second discriminator field, and the same first diagnostic code in the diagnostic field as the S-BFD control packet received at the network element.

15. The one or more non-transitory computer readable storage media of claim 13, wherein, when the second action is designated, the instructions cause the processor to perform:

modifying the S-BFD control packet to change the first discriminator field to the second discriminator ID, change the second discriminator field to the first discriminator ID, and change the diagnostic field to a second diagnostic code.

16. The one or more non-transitory computer readable storage media of claim 9, further comprising instructions that cause the processor to perform:

receiving a plurality of S-BFD control packets, wherein each S-BFD control packet includes at least an indicated segment ID associated with an entity of the plurality of entities;

performing the lookup operation for each indicated segment ID in the stored data of the network element; and based on the lookup operation, when a first action is designated in the stored data for a particular indicated segment ID, returning that S-BFD control packet to a source; and when a second action is designated in the stored data for the particular indicated segment ID, forwarding that S-BFD control packet to an S-BFD reflector session.

17. An apparatus comprising:

a plurality of network ports configured to receive inbound packets and to send outbound packets, the plurality of network ports in communication with a plurality of entities that are monitored by the apparatus;

a memory; and a processor coupled to the memory and to the plurality of network ports, wherein the processor is configured to:

assign a unique segment identifier (ID) to each entity of the plurality of entities that are monitored;

receive a seamless bidirectional forwarding detection (S-BFD) control packet, the S-BFD control packet including at least a first segment ID associated with a particular entity of the plurality of entities;

perform a lookup operation for the first segment ID in stored data;

determine whether the particular entity is functioning normally based on the lookup operation; and handle a forwarding disposition of the S-BFD control packet based on determining whether the particular entity is functioning normally.

18. The apparatus of claim 17, wherein the processor is configured to handle the forwarding disposition of the S-BFD control packet by changing an action from a first action to a second action.

19. The apparatus of claim 18, wherein the processor is configured to handle the forwarding disposition of the S-BFD control packet by changing the action from the first action to the second action based on determining whether or not the particular entity is functioning normally.

20. The apparatus of claim 17, wherein the processor is configured to handle the forwarding disposition by:

when a first action is designated in the stored data for the first segment ID, returning the S-BFD control packet to its source; and when a second action is designated in the stored data for the first segment ID, forwarding the S-BFD control packet to an S-BFD reflector session.

* * * * *